United States Patent Office 2,997,523
Patented Aug. 22, 1961

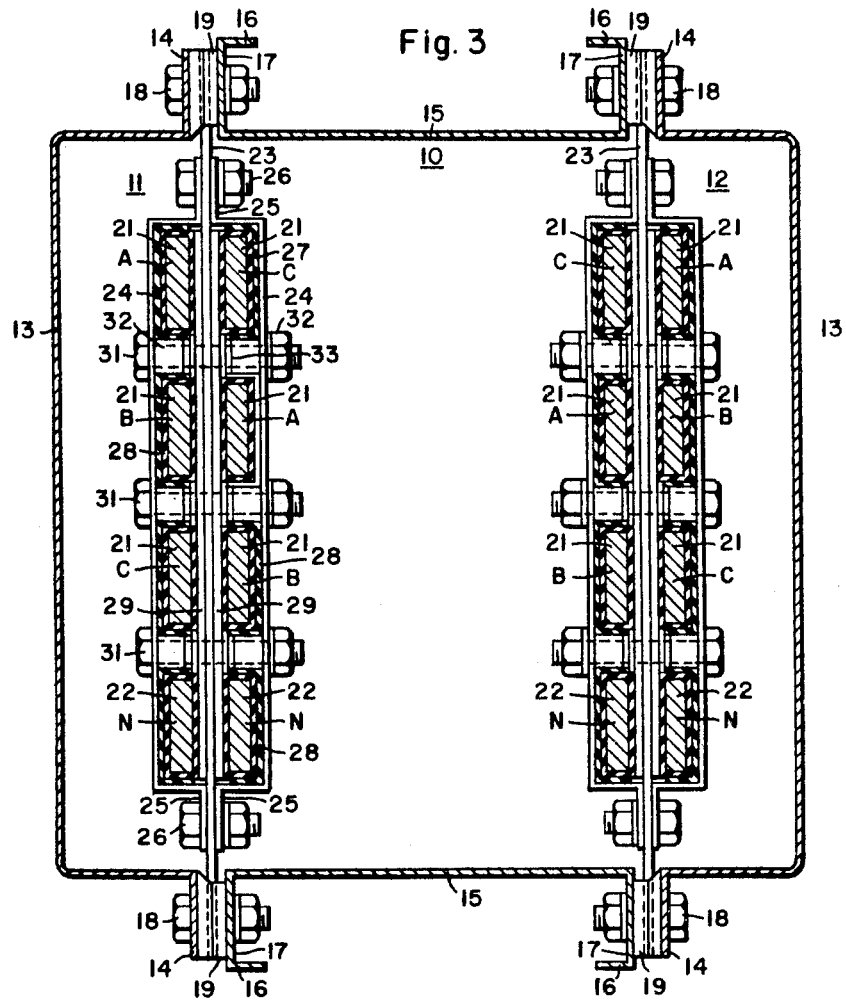

2,997,523
DISTRIBUTION APPARATUS
Charles L. Weimer, Patterson Heights, and Samuel S. Fouse, Aliquippa, Pa., assignors to Westinghouse Electric Corporation, East Pittsburgh, Pa., a corporation of Pennsylvania
Filed Nov. 21, 1958, Ser. No. 775,433
5 Claims. (Cl. 174—99)

This invention relates, generally, to electrical distribution apparatus and, more particularly, to distribution apparatus of the type generally known as bus duct in which bus bars are disposed inside a metal housing which is manufactured in sections of a predetermined length.

Heretofore, the maximum current rating in one housing of commercial bus duct has been 1000 amperes. If a higher rating was desired, two runs of bus duct were paralleled electrically and mechanically; that is for 1600 amperes two 800 ampere runs were used, or for 2000 amperes two 1000 ampere runs were used. The paralleling of bus duct runs electrically and mechanically has not been entirely satisfactory. The over-all dimensions of a double run of bus duct are such that it is not suitable for installation in the steel frame work of a building.

An object of this invention is to increase the current rating of bus duct having a single housing.

Another object of the invention is to provide for mounting the bus bars in the housing without utilizing insulators.

A further object of the invention is to provide low impedance bus duct which can be utilized as plug-in duct.

Other objects of the invention will be explained fully hereinafter or will be apparent to those skilled in the art.

In accordance with one embodiment of the invention, a plurality of sets of bus bars are mounted in one metal housing with the bus bars in each set disposed in paired-phase relationship and clamped to a steel plate by steel brackets. The plate is supported by the housing which comprises generally channel-shaped members. Each bus bar is taped and the taped bars are protected from the steel brackets by fiber or nylon spacers, thereby making it unnecessary to use porcelain insulators to support the bus bars.

For a better understanding of the nature and objects of the invention, reference may be had to the following detailed description, taken in conjunction with the accompanying drawings, in which:

FIG. 3 is an enlarged view, in section, taken along the line III—III in FIG. 2.

Figure 1:
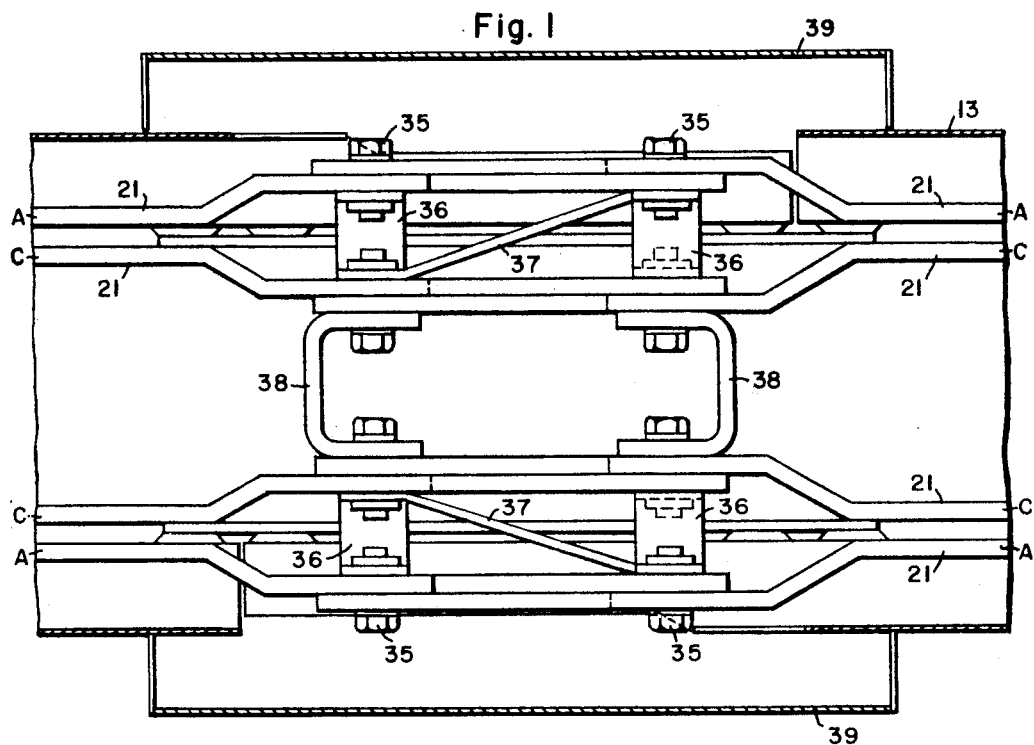
FIGURE 1 is a view, partly in section and partly in plan of a joint between two sections of bus duct embodying the principal features of the invention.
Figure 2:
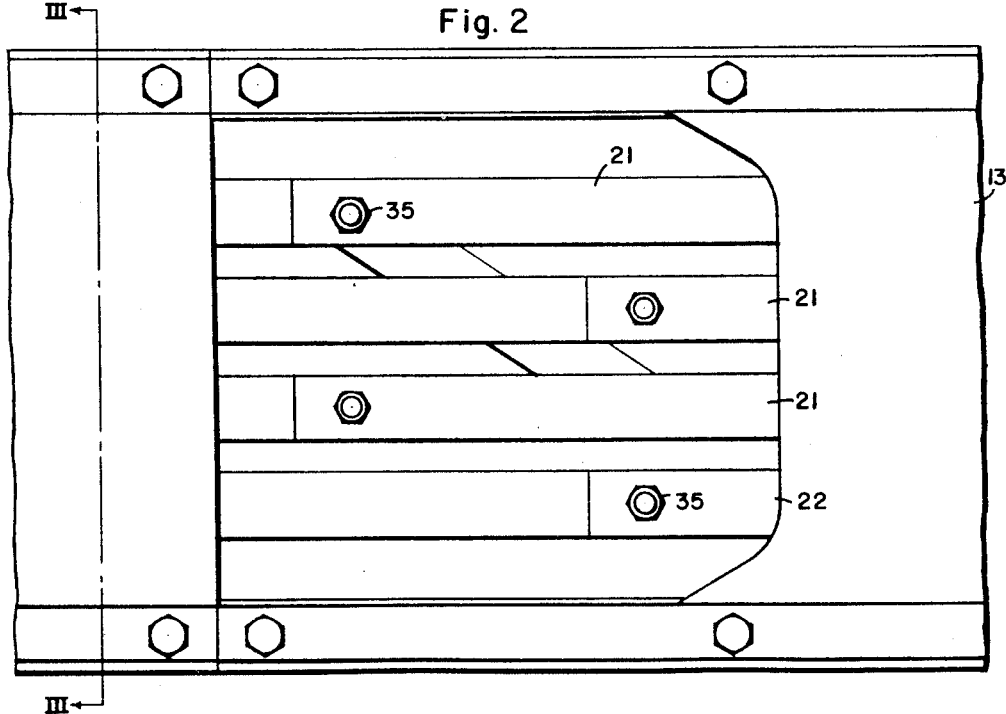
FIG. 2 is a view, in side elevation, of the bus duct joint shown in FIG. 1.

Referring to the drawings, and particularly to FIG. 3, the bus duct shown therein comprises a housing 10 which contains two sets of paired-phase bus bars 11 and 12. The housing 10 comprises two generally channel-shaped members 13 having outwardly turned portions 14 thereon. The members 13 are spaced apart by generally channel-shaped members 15 having inwardly turned portions 16 thereon. The outwardly turned portions 14 of the members 13 are bolted to flanges 17 of the members 15 by bolts 18. Spacing members 19 may be provided on the bolts 18 between the portions 14 and the flanges 17.

In the present instance each set of bus bars comprises six phase bars 21 and two neutral bars 22. If desired, the neutral bars may be omitted from the structure. As shown, the phase bars 21 are disposed in paired-phase relationship. Thus, bars for phases A and C are paired and spaced relatively closely together. Likewise, bars for phases B and A are paired and spaced closely together, and bars for phases C and B are paired and spaced closely together. In this manner the reactance is reduced, thereby reducing the voltage drop when the bars are carrying relatively heavy currents.

The bus bars in each set are supported by a steel plate 23 which is disposed between the paired-phase bars. The plate 23 is attached to the housing 10 by the bolts 18 which extend through openings provided in the ends of the plate 23. The ends of the plate 23 are disposed between the outwardly extending portions 14 of the members 13 and the flanges 17 of the members 15. The bus bars are retained on the plate 23 by oppositely disposed generally channel-shaped brackets 24 having outwardly extending portions 25 thereon. The brackets 24 are attached to the plate 23 by bolts 26 which extend through the plate 23 and the portions 25 of the brackets 24.

Each bus bar is covered with an insulating tape 27 except at the ends of the bars where two sections of duct are connected together and at the locations of plug-in openings in the duct housing if such openings are provided. In addition to the tape on the bus bars, channel-shaped insulating members 28 are provided between the bus bars and the brackets 24. Also insulating spacers 29 are provided between the bus bars and the plate 23. The members 28 and the spacers 29 may be composed of fiber nylon. Thus, the bus bars are well protected where they are clamped to the plate 23 by means of the brackets 24. It will be understood that the plates 23 and the brackets 24 may be located at desired intervals along the duct housing.

In addition to the bolts 26 which draw the brackets 24 together, bolts 31 extend through the brackets 24 and plate 23 between the pairs of bus bars. Spacing sleeves 32 and spacing washers 33 are provided on the bolts 31. In this manner the pressure applied on the bus bars by the brackets 24 may be adjusted by increasing or decreasing the number of spacing washers provided on each bolt 31. Thus, the bus bars may be held firmly in position, thereby enabling the structure to withstand the stress imposed by short circuit currents.

As shown in FIG. 1, the bus bars overlap each other at the joints between the sections and are connected together by bolts 35. The corresponding phase bars in each set are connected by phase tie straps 36 and 37. In the present instance the straps 36 connect the bars for phase A together and likewise the bars for phase B. The straps 37 connect the bars for phase C. The bars for corresponding phases in the two sets are connected together by U-shaped tie straps 38. Thus, the bars for phase C in the two sets are joined by the tie straps 38. Likewise, the bars for phase A are joined by straps 38 and the bars for phase B are connected by straps 38. The connections at the joints are protected by access covers 39 which are attached to the duct housing. The duct housing may be supported in a building by hangers (not shown) which may be attached to the inwardly extending portions 16 of the channel members 15 in a manner well-known in the art.

As shown, two sets of paired-phase bars are provided in a single housing. Thus, the current capacity of a bus duct may be increased. It will be understood that the current capacity of a single run of duct may be still further increased by providing additional sets of bars in a single housing. In this manner the current capacity may be increased without the necessity of paralleling two housings mechanically which requires more space than is required for bus duct of the present type in which two or more sets of bars are provided in a single housing.

As previously explained, plug-in openings may be provided in the present housing if desired. It will be noted that the phases in each set of bars are paired in such a manner that the same phase sequence, namely ABC is provided for the bars which are adjacent to the members 13 in which the plug-in openings would be provided. Thus, plug-in units of a type adapted for attaching to the members 13 may be utilized.

From the foregoing description it is apparent that the present structure has numerous advantages such as paired-phases which give a low impedance, and the bus bars are rigidly supported without requiring porcelain or other insulators which are subject to breakage. The structure is suitable for the utilization of plug-in units, thereby providing a structure having the advantages of low impedance and plug-in convenience. The present structure requires less sheet metal, hardware, hangers and less space than a double run of bus duct of the same rating. If the U-shaped tie straps 38 are omitted, two separate circuits may be provided in a single housing.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a bus duct, in combination, a duct housing comprising two oppositely disposed generally channel-shaped members having outwardly extending portions thereon, generally channel-shaped spacing members disposed between said outwardly extending portions, fastening means extending through said portions and said spacing members, at least two sets of bus bars inside the housing, the distance between sets being determined by said spacing members, each set comprising at least six bars disposed in paired-phase relationship with the bars in each pair being of a different phase, a plurality of metal plates disposed between the paired-phase bars in each set, said plates being spaced longitudinally of the housing, metal brackets for retaining the bars on the plates, insulation disposed between the brackets and the bars, additional insulation disposed between the bars and each metal plate, and the ends of each metal plate being attached to said housing by said fastening means to constitute the sole support for the bars attached to said plate.

2. In a bus duct, in combination, a duct housing comprising two oppositely disposed generally channel-shaped members having outwardly extending portions thereon, generally channel-shaped spacing members disposed between said outwardly extending portions, fastening means extending through said portions and said spacing members, at least two sets of bus bars inside the housing, the distance between sets being determined by said spacing members, each set comprising at least six bars disposed in paired-phase relationship with the bars in each pair being of a different phase, a plurality of metal plates disposed between the paired-phase bars in each set, said plates being located at predetermined intervals along the housing, metal brackets for retaining the bars on the plates, insulation disposed between the brackets and the bars, additional insulation disposed between the bars and each metal plate, and the ends of the metal plates being attached to said housing by said fastening means to support the bus bars by means of said plates.

3. In a bus duct, in combination, a duct housing comprising two oppositely disposed spaced generally channel-shaped members having outwardly extending portions thereon, generally channel-shaped spacing members disposed between said outwardly extending portions, fastening means extending through said portions and said spacing members, at least two sets of bus bars inside the housing, the distance between sets being determined by said spacing members, each set comprising at least six bars disposed in paired-phase relationship with the bars in each pair being of a different phase, a plurality of metal plates disposed between the paired-phase bars in each set, said plates being spaced longitudinally of the housing, generally channel-shaped metal brackets attached to opposite sides of each plate to retain the bars on the plate, insulating disposed between the brackets and the bars, additional insulation disposed between the bars and each plate, and the ends of the plates being attached to said housing by said fastening means to support the bus bars by means of said plates.

4. In a bus duct, in combination, a duct housing comprising two oppositely disposed spaced generally channel-shaped members having outwardly extending portions thereon, generally channel-shaped spacing members disposed between said outwardly extending portions, fastening means extending through said portions and said spacing members, at least two sets of bus bars inside the housing, the distance between sets being determined by said spacing members, each set comprising at least six bars disposed in paired-phase relationship with the bars in each pair being of a different phase, adjacent bars in different sets being of the same phase, connectors connecting bars of the same phase together, a plurality of plates disposed between the paired-phase bars in each set, said plates being located at predetermined intervals along the housing, brackets attached to each plate to retain the bars on the plate, insulation disposed between the brackets and the bars, additional insulation disposed between the bars and each plate, and the ends of each plate being attached to said housing by said fastening means to support the bus bars by means of said plates.

5. In a bus duct, in combination, a duct housing comprising two oppositely disposed spaced generally channel-shaped members having outwardly extending portions thereon, generally channel-shaped spacing members disposed between said outwardly extending portions, fastening means extending through said portions and said spacing members, at least two sets of bus bars inside the housing, the distance between sets being determined by said spacing members, each set comprising at least six bars disposed in paired-phase relationship with the bars in each pair being of a different phase, adjacent bars in different sets being of the same phase, generally U-shaped connectors connecting bars of the same phase in different sets together, additional connectors connecting bars of the same phase in each set together, a plurality of plates disposed between the paired-phase bars in each set, said plates being spaced longitudinally of the housing, oppositely disposed brackets attached to each plate to retain the bars on the plate, insulation disposed between the brackets and the bars, additional insulation disposed between the bars and each plate, and the ends of each plate being attached to said housing by said fastening means to support the bus bars by means of said plate.

References Cited in the file of this patent

UNITED STATES PATENTS

| | | |
|---|---|---|
| 730,251 | Gibbs | Dec. 1, 1902 |
| 1,620,552 | Jacobs et al. | Mar. 8, 1927 |
| 2,262,067 | Togesen et al. | Nov. 11, 1941 |
| 2,287,502 | Togesen et al. | June 23, 1942 |
| 2,372,267 | Frank et al. | Mar. 27, 1945 |
| 2,903,503 | Carlson et al. | Sept. 8, 1959 |

FOREIGN PATENTS

| | | |
|---|---|---|
| 1,054,359 | France | Oct. 7, 1953 |